March 2, 1943. S. R. RIESEN 2,312,486
TRACTION INCREASING DEVICE
Filed April 2, 1941 2 Sheets-Sheet 1

Inventor

SCHILLER R. RIESEN

By *Clarence A. O'Brien*

Attorney

March 2, 1943.   S. R. RIESEN   2,312,486
TRACTION INCREASING DEVICE
Filed April 2, 1941   2 Sheets-Sheet 2
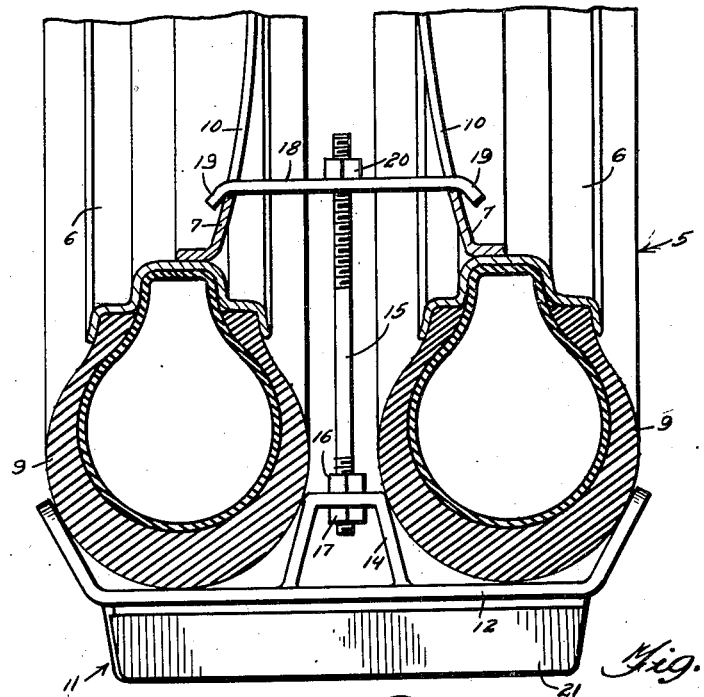
Fig. 3.
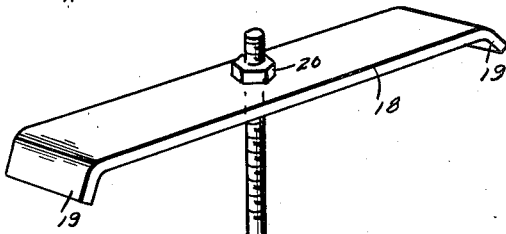
Fig. 4.
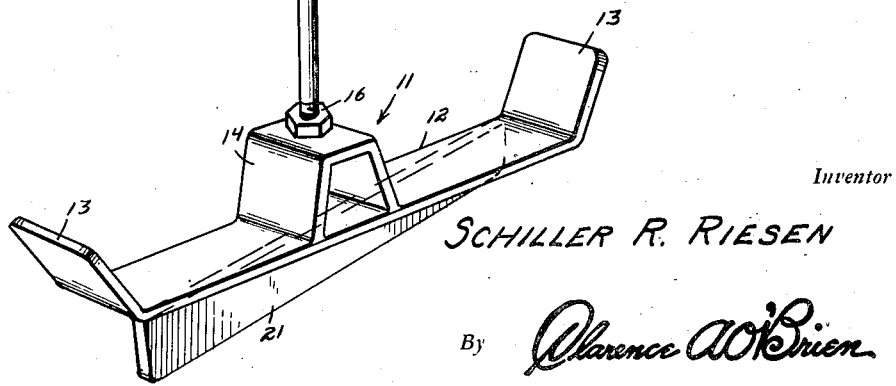
Inventor
SCHILLER R. RIESEN
By *Clarence A. O'Brien*
Attorney

UNITED STATES PATENT OFFICE 2,312,486

TRACTION INCREASING DEVICE

Schiller R. Riesen, Ponca City, Okla., assignor of seventy per cent to Avy V. Masterson, Belleville, Kans., and ten per cent to J. G. Shreckengaust, Ponca City, Okla.

Application April 2, 1941, Serial No. 386,517

1 Claim. (Cl. 152—220)

This invention appertains to new and useful improvements in traction increasing appliances for vehicle wheels. The invention more particularly relates to a traction increasing cleat for dual wheel assemblies.

The principal object of the present invention is to provide a traction increasing device for dual wheel assemblies constructed in such a manner as to permit clamping of the cleated piece with the cleat proper bridging the tread portions of the complementary wheels.

Another important object of the invention is to provide a device of the character stated which can be easily applied and removed.

These and other important objects and advantages of the invention will become apparent to the reader of the following specification.

In the drawings:

Figure 3 is a fragmentary enlarged sectional view taken substantially on the line 3—3 of Figure 2.

Figure 4 is an enlarged perspective view of the traction increasing device.

Figures 1, 2:
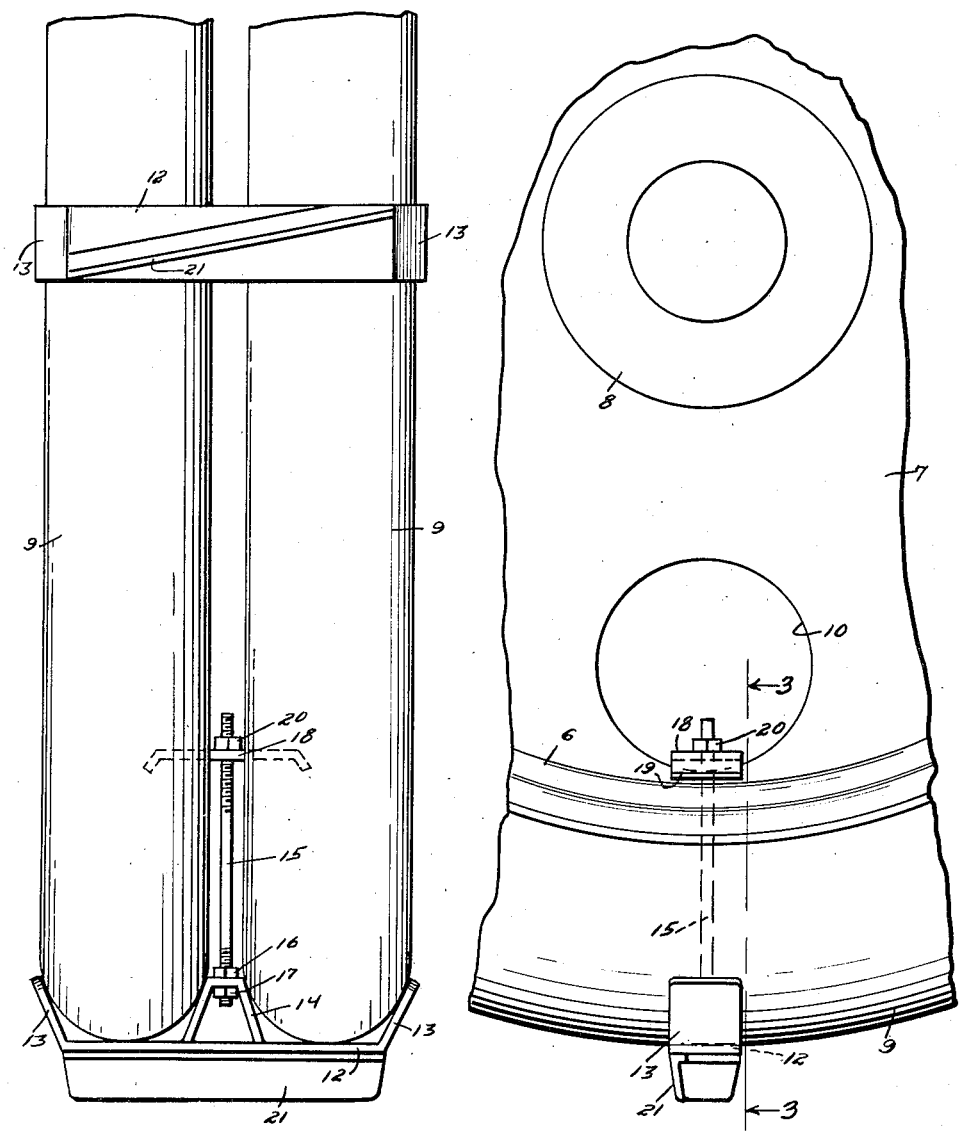
Figure 1 is a fragmentary tread elevational view of a dual wheel assembly showing a pair of the traction increasing devices applied.
Figure 2 is a fragmentary side elevational view showing one of the devices applied.

Referring to the drawings wherein like numerals designate like parts, it can be seen that numeral 5 generally refers to a dual wheel assembly consisting of rims 6, 6, sheet steel disks or webs 7, 7 connecting the rims 6 with corresponding hubs 8, and tires 9, 9 mounted on the rims 6, 6. As is common, the wheel disks 7, 7 are formed with openings 10 adjacent the outer edge portion thereof and it is in conjunction with these openings that the present invention, which is generally referred to by numeral 11 is employed.

The present invention specifically consists of an elongated tread traversing plate 12 having obliquely disposed end portions 13 adapted to overlap outermost portions of the tires 9, 9, as in the manner shown in Figure 3. This plate 12 is narrow and is provided with a substantially inverted U-shaped riser 14 at the intermediate portion thereof, apertured to receive the corresponding threaded end of a tie rod 15. Nuts 16 and 17 are provided on this threaded end portion of the rod 15, at the outside and inside of the riser 14, these nuts being fed on the threaded portion to bind against the inside and outside of the riser 14 to hold the rod 15 in definite position projecting outwardly at substantial right angles to the plate 12.

Numeral 18 denotes a bridge plate having laterally turned end portions 19, 19 which overlap edge portions of the disks 7 at the openings 10 therein. The intermediate portion of this bridge member 18 has an opening for receiving the remaining and threaded end portion of the rod 15 and a nut 20 is provided on this end portion of the rod 15. When the tread plate 12 is properly disposed across the tread portions of the tires 9, 9, and the rod 15 disposed through the opening in the bridge plate 18, the nut 20 can be applied and fed down to a position tightly against the bridge plate 18, so as to firmly maintain the tread plate 12 against the tread portions of the tires 9, 9. As is clearly shown in Figures 2 and 4, a cleat 21 is provided on the ground engaging side of the plate 12 and extends diagonally across the plate, the purpose in having the cleat disposed diagonally being to permit the same to clean itself of mud and other accumulations.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

A traction increasing device for dual disk wheel assemblies wherein the adjacent wheels are slightly spaced apart and the webs thereof are provided with opposed edge openings; a tread plate disposed transversely across the tires of a dual wheel assembly and having angular straight end portions for fitting against the outermost side portions of the tires of the dual wheel assembly, an open tapered riser at the intermediate portion of the bridge member adapted to be wedged between the tires and having an opening in the outer portion thereof, an elongated rod for disposition between the wheels of an assembly and having one end disposed through the opening in the riser, and provided with securing means thereon for securing the rod to the riser, and a clamp structure at the remaining end of the rod comprising a flat bar adapted to be inserted at its ends into said openings to bear against the edges thereof, said ends being inclined to prevent the same from creeping off said edges, said tread plate having a traction increasing cleat thereon.

SCHILLER R. RIESEN.